S. G. WINGQUIST.
ROLLER BEARING.
APPLICATION FILED NOV. 18, 1915.
1,224,346.
Patented May 1, 1917.
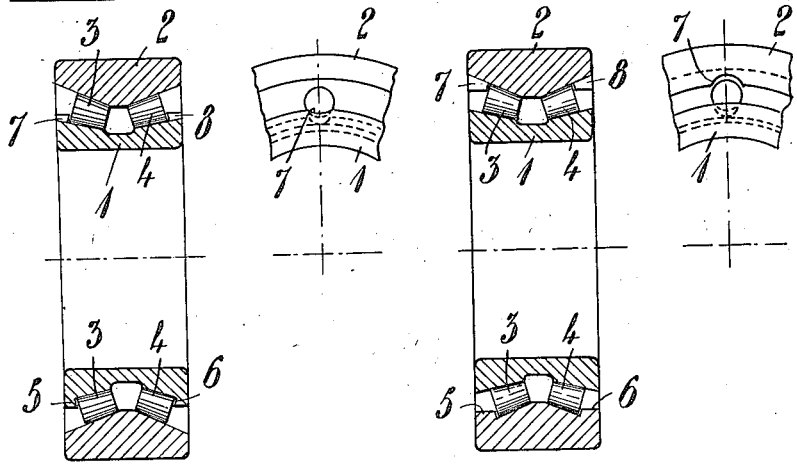
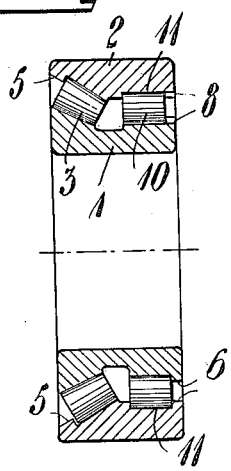
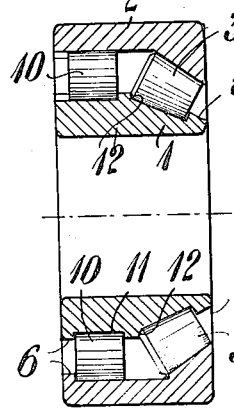
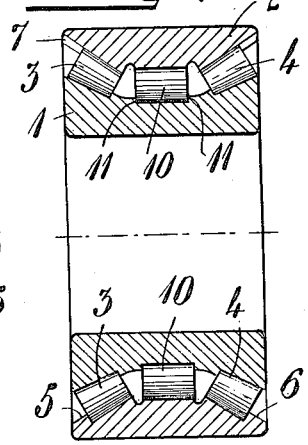
Inventor:
Sven Gustaf Wingquist
By Attorneys
Fraser, Tonks & Myers

UNITED STATES PATENT OFFICE.

SVEN GUSTAF WINGQUIST, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

ROLLER-BEARING.

1,224,346.  Specification of Letters Patent.  Patented May 1, 1917.

Application filed November 18, 1915. Serial No. 62,088.

*To all whom it may concern:*

Be it known that I, SVEN GUSTAF WINGQUIST, a citizen of the Kingdom of Sweden, residing at Gottenborg, Sweden, have invented new and useful Improvements in Roller-Bearings, of which the following is a specification.

This invention relates to roller bearings and more especially to roller bearings of the type having each bearing ring formed in one piece and provided with uninterrupted races for the rollers, which are guided in the bearing by means of flanges provided on either bearing ring or on both of them and formed integrally with said rings.

The principal object of the invention is the provision of a roller bearing of said class in a simple and suitable form constituting a self-contained unit without the use of any special assembling means and adapted to be inserted into various bearings for shafts, journals, wheel-hubs and the like.

With this object in view the invention consists, chiefly, in a self-contained radial and thrust bearing comprising an integral outer ring having a conical race, an integral inner ring having a conical race the apex of which coincides with the apex of the outer race and the top angle of which is smaller than that of the outer race, conical rollers placed between the said rings, in contact with the said races, one of said rings having, outside its race, a shoulder formed integral with the ring to keep the rollers in position, said shoulder having a filling opening for the rollers.

The invention is hereinafter described in connection with the accompanying drawings which illustrate various exemplifying forms of the invention and in which:—

Figure 1 is a longitudinal section of a bearing embodying the invention and having two rows of conical rollers, and Fig. 2 is a partial end view thereof. Figs. 3 and 4 are corresponding views of a modified form of the bearing. Figs. 5, 6, and 7 are sections of bearings having both cylindrical and conical rollers.

Referring to the constructional form shown in Figs. 1 and 2, 1 denotes the inner bearing ring and 2 the outer bearing ring, each of said rings being formed in one piece and provided with conical races between which two sets of conical rollers 3 and 4 are disposed. In order to reduce the friction as far as possible the races and the rollers are, preferably, so formed, that the common apex of their conical surfaces is situated on the geometrical axis of the bearing. To prevent the rollers from falling out of the bearing the inner ring 1 is formed witn flanges or projections 5 and 6 outside the outer ends of the rollers, said flanges being interrupted, at one or more points, by filling openings 7 and 8 for the purpose of inserting the rollers between the bearing rings. In the constructional form shown in Figs. 1 and 2 one filling opening is provided for each set of rollers. It is, however, feasible to omit the filling opening provided for the one set of rollers, in which case the bearing is assembled in the following manner: First the said set of rollers is disposed on the inner ring, then the outer ring is passed in axial direction onto said set of rollers, and finally, the other set of rollers is inserted through the corresponding filling opening.

The constructional form shown in Figs. 3 and 4 differs from that shown in Figs. 1 and 2 only in that the flanges 5, 6, which prevent the rollers from falling out of the bearing, are placed on the outer ring 2 instead of being placed on the inner ring. The construction may also be such that flanges are arranged on both rings.

The bearings shown in Figs. 1 to 4 are adapted to carry radial loads as well as thrust loads in either direction. If the thrust load in one direction exceeds considerably the thrust load in the opposite direction, the bearing may be of unsymmetrical form, which may be realized by causing the generatrices of the conical races at the one side of the bearing to form a greater angle with the axis of the bearing than the corresponding angle formed by the generatrices at the other side thereof.

Fig. 5 illustrates a constructional form of a bearing having one set of conical rollers 3 and one set of cylindrical rollers 10 inserted between two bearing rings 1 and 2, each of which is formed in one piece. The conical rollers 3 are prevented from falling out of the bearing by a flange 5 placed on the outer ring outside the ends of the rollers. The bearing has no filling opening for the conical rollers, because a sufficient opening for the insertion of said rollers is obtained by moving the rings in axial direction, ere the cylindrical rollers 10 are inserted. The flange 5 may also be formed on the inner bearing ring 1, or both rings 1 and 2 may be provided with such flanges. The cylindrical rollers 10 are prevented from falling out of the bearing by flanges 6 placed on the inner ring outside the outer ends of the rollers, or by flanges formed on the inner ring as well as on the outer ring, as is shown in the drawing. To enable the rollers 10 to be inserted the flanges 6 are at one point interrupted by filling openings 8. One ring or both of them may, preferably, be formed with projections or shoulders also at the inner ends of the rollers 10 in order to prevent the rollers from moving inwardly. Such a projection or shoulder is in Fig. 5 shown on the outer bearing ring at 11. The bearing illustrated in Fig. 5 may be modified in such manner, that the outer flange at the cylindrical race of one ring is omitted, while the other flange is formed without any filling opening, a filling opening, on the contrary, being provided for the conical rollers. In this case the bearing is assembled in the following manner: The cylindrical rollers are first inserted in the bearing ring provided with the outer flange, then the bearing ring formed without flange is passed in axial direction onto the cylindrical rollers, and finally the conical rollers are inserted through the corresponding filling opening. Of course, also in this constructional form filling openings may be provided for both sets of rollers which arrangement may be necessary, in case a cage be used to retain the rollers in proper positions, said cage preventing the rings from moving axially.

The form shown in Fig. 6 differs from that shown in Fig. 5 mainly in that the larger end surfaces of the conical rollers 3 are directed toward the cylindrical rollers 10, while according to Fig. 5 the said surfaces are directed outwardly. The conical rollers 3 are retained in proper positions by a shoulder 12 provided at the inner end of their race, and by a flange 5 at the outer end of the race. The latter may, if desired, be omitted, since the rollers are prevented from moving outwardly owing to their conical shape. The cylindrical rollers 10 are retained in proper positions by flanges 6 formed on the inner and the outer bearing ring outside the outer ends of the rollers, and by a shoulder 11 at the inner end of the cylindrical race of the inner ring. The bearing is assembled by first placing the conical rollers 3 on the inner ring, whereupon the outer ring is passed axially onto the said rollers. Then the cylindrical rollers are inserted through the corresponding filling opening, and then the bearing constitutes a self-contained unit.

The constructional forms shown in Figs. 5 and 6 are adapted to sustain radial load and thrust load acting in one direction only. If the bearing be intended for sustaining radial load as well as thrust load in any direction, and if a bearing especially adapted for radial loads is to be constructed, the bearing having two sets of conical rollers may be completed by the provision of one set of cylindrical rollers. Such a constructional form is illustrated in Fig. 7. The cylindrical rollers 10 are retained in proper positions by shoulders 11 provided at both ends of the cylindrical race of the inner ring. The conical rollers 3, 4 are retained in proper positions by flanges 5, 6 provided on the outer bearing ring outside the ends of the rollers. This bearing is assembled by placing the cylindrical rollers in proper positions on the inner ring, whereupon the outer ring is passed axially onto said rollers. Then the conical rollers 3, 4 are inserted through the corresponding filling openings 7, 8. The filling opening intended for the one row of conical rollers may, if desired, be omitted, and said row of conical rollers together with the cylindrical rollers may, in such case, be inserted by mutual movement of the rings in axial direction. When all the rollers have been placed in proper positions, the bearing is kept together to form a self-contained unit by means of the conical rollers.

It is not necessary that the filling openings in the constructional forms described above be so deep that their bottom is in flush with the race within said openings, since the bottom of the filling opening may be situated somewhat higher than the adjacent portion of the surface of the race. In this case the insertion of the rollers is effected by heating the outer ring or by cooling the inner ring and the rollers (if desired, by the combination of both methods) or by a deformation of the rings and the rollers not exceeding the limit of elasticity. In such case a small projection remains also at the filling opening outside the race thus preventing the rollers inserted into the bearing from falling out through the filling opening.

Having now described my invention, what I claim as new and desire to secure by Letters Patent is:

1. A self-contained radial and thrust bearing comprising an integral outer ring having a conical race, an integral inner ring having a conical race the top angle of which is smaller than that of the outer race, conical rollers placed between the said rings, in contact with the said races, one of said rings having, outside its race, a shoulder formed integral with the ring to keep the rollers in position, said shoulder having a filling opening for the rollers, substantially as described.

2. A self-contained radial and thrust bearing comprising an integral outer ring having a conical race, an integral inner ring having a conical race the apex of which coincides with the apex of the outer race and the top angle of which is smaller than that of the outer race, conical rollers placed between the said rings in contact with the said races, one of said rings having, outside its race, a shoulder formed integral with the ring to keep the rollers in position, said shoulder having a filling opening for the rollers, substantially as described.

3. A self-contained radial and double thrust bearing comprising an integral outer ring having conical races, an integral inner ring having conical races each of which forms together with an outer race a conical passage, the top angle of each of said inner races being smaller than that of the corresponding outer race, conical rollers placed between the said rings in contact with an outer and an inner race, one of said rings having, outside its races, shoulders formed integral with the ring to keep the rollers in position, each shoulder having a filling opening for the rollers, substantially as described.

4. A self-contained radial and double thrust bearing comprising an integral outer ring having conical races, an integral ring having conical races each forming together with an outer race a conical passage, the apex of each of said inner races coinciding with the apex of the corresponding outer race and the top angle of said inner races being smaller than that of the corresponding outer race, conical rollers placed between the said rings in contact with an outer and an inner race, one of said rings having, outside its races, shoulders formed integral with the ring to keep the rollers in position, each shoulder having a filling opening for the rollers, substantially as described.

5. A self-contained radial and thrust bearing comprising an integral outer ring having a conical race, an integral inner ring having a conical race the top angle of which is smaller than that of the outer race, conical rollers placed between the said rings, in contact with the said races, each ring having, outside its race, a shoulder formed integral with the ring to keep the rollers in position, each shoulder having a filling opening for the rollers, substantially as described.

6. A self-contained radial and thrust bearing comprising an integral outer ring having a conical race, an integral inner ring having a conical race the top angle of which is smaller than that of the outer race, conical rollers placed between the said rings, in contact with the said races, one of said rings having, outside its race, a shoulder formed integral with the ring to keep the rollers in position, said shoulder having a filling opening for the rollers, the bottom of said filling opening lying somewhat higher than the adjacent portion of the race, substantially as described.

7. A self-contained roller bearing, comprising cylindrical and conical rollers and inner and outer bearing rings each formed in one piece and provided with races for the rollers, and shoulders at the sides of said races, some of said shoulders being interrupted by filling openings for the rollers.

In testimony whereof I have signed my name in presence of two subscribing witnesses.

SVEN GUSTAF WINGQUIST.

Witnesses:
KARL RUNESKOG,
ALOF PALRY.